United States Patent [19]
Goldsmith

[11] 3,762,638
[45] Oct. 2, 1973

[54] THERMOSTATIC MIXING VALVE

[75] Inventor: Derek John Goldsmith, Sevenoaks, England

[73] Assignees: Derek John Goldsmith; Derek Francis Pratt, both of Kreuzlingen, Switzerland

[22] Filed: May 21, 1971

[21] Appl. No.: 145,691

Related U.S. Application Data

[63] Continuation-in-part of Ser. No. 851,357, Aug. 19, 1969, abandoned.

[30] Foreign Application Priority Data

| Aug. 26, 1968 | Great Britain | 40,623/68 |
| Mar. 11, 1969 | Great Britain | 12,871/69 |
| May 4, 1971 | Great Britain | 12,971/71 |

[52] U.S. Cl. .................................. 236/12, 137/90
[51] Int. Cl. .................................. G05d 23/13
[58] Field of Search .................... 236/12 R, 101; 137/90

[56] References Cited
UNITED STATES PATENTS

| 548,330 | 10/1895 | Tobey | 236/12 |
| 773,541 | 11/1904 | Bunting, Jr. | 236/12 |
| R19,488 | 3/1935 | Russell et al. | 236/12 |
| 1,989,335 | 1/1935 | Parsons | 236/12 |

FOREIGN PATENTS OR APPLICATIONS

| 417,312 | 10/1934 | Great Britain | 236/12 R |
| 1,125,724 | 3/1962 | Germany | 236/12 R |

*Primary Examiner*—William E. Wayner
*Attorney*—Stevens, Davis, Miller & Mosher

[57] ABSTRACT

The invention relates to a thermostatic mixing valve in which a coiled coil laminated strip of bimetal is used as a temperature responsive element to control the ratio of admixture of hot and cold fluids. Preferably the element is located within a space provided with means for admitting mixed fluid into the space at or near one end of the temperature responsive element and the outlet port is provided from said space at a position intermediate the ends of the temperature responsive element, whereby a changed velocity feed back control function is achieved.

17 Claims, 4 Drawing Figures

THERMOSTATIC MIXING VALVE

This application is a continuation-in-part of my prior application Ser. No. 851,357, filed Aug. 19, 1969, now abandoned.

This invention relates to thermostatic mixing valves. The invention is especially applicable to thermostatic mixing valves which can be used domestically, for example in controlling the flow of water to a shower, wash basin, bath, kitchen sink or the like.

According to the invention there is provided a thermostatic mixing valve comprising a housing, two fluid inlet ports for admitting fluid to be mixed, an outlet port for discharging fluid from the housing, and thermal control means for adjusting the ratio of quantities of fluid admitted from the inlet ports in response to the temperature of fluid flowing from the inlet ports to the outlet port, said thermal control means including a temperature responsive element comprising a coiled coil, as hereinafter defined, laminated strip. When using the term "coiled coil" herein we are referring to an element which has been formed first by bending a strip into the form of a helix with spaced convolutions, this helix then being itself formed into a larger helix with the axis of the first helix following the helical form of the larger helix. While normally the laminated strip is of bimetal, it may, for example be fabricated from a non-metallic material such as plastics materials having different coefficients of thermal expansion. The strip may be provided with a protective coating of metal or other material, to prevent or reduce corrosion at the juncture of laminated metals forming the strip. While most suitably the axis of the main, or larger, helix may be rectilinear, the axis of the main helix may itself follow a curved path.

Preferably the temperature responsive element is located in a space within the housing provided with means for admitting mixed fluid into the space at or near one end of the temperature responsive element and the outlet port is provided from said space in a position intermediate the ends of the temperature responsive element. With this arrangement the portion of the space between the outlet port and the other end of the temperature responsive element helps to provide a feed back function helping to prevent excessive fluctuation or hunting of the thermal control means in controlling the proportions of hot and cold fluid being mixed within the mixing valve, while the progressive passage of mixed fluid past successive convolutions of the temperature responsive element provides a particularly quick and accurate response as a function of the rate of change of the control variable.

In prior thermostatic mixing valves it has normally been proposed to pass mixed fluid on its way to the outlet past the entire length of the temperature responsive element in order to obtain the maximum response of the temperature responsive element to changes in temperature of mixed fluids. However this has the disadvantage that by increasing the sensitivity of the temperature responsive element there is an increased tendency for the thermostatic valve to hunt or fluctuate widely about a desired temperature setting. Thus the sensitivity of the prior thermostatic mixing valves were limited by the need to prevent excessive hunting which would in itself lead to inefficient operation of the mixing valve. With this preferred form of the present invention, the space, or pocket, around the end portion of the temperature responsive element which is not in the main stream of flow through the outlet acts to damp operation of the temperature responsive element so as to prevent or reduce the tendency to fluctuate or hunt which would otherwise be present. However, when the temperature of the mixed fluid is widely different from that required the flow of mixed fluid into the end pocket will still take place, albeit more slowly than to the portion of the temperature responsive element directly in the flow path, so that this end portion of the temperature responsive element is still effective in obtaining a large initial response to obtain a coarse setting of the valve before the finer setting takes place. The coiled form of the temperature responsive element is helpful in this regard as helping to ensure a steady, although relatively slow, change in the fluid present in the pocket. Also, with this arrangement, since only a short portion of the length of the temperature responsive element lies in the flow path, this element provides a smaller restriction to the flow of fluid therepast than would be the case were the fluid to be passed along the entire length of a temperature responsive element.

Preferably the temperature control means comprises a valve member mounted for controlling the proportions of fluid flow through spaced hot and cold mixing ports respectively connected to the two inlet ports, said valve member being movable in response to changes in axial length of the coiled coil temperature responsive element. Suitably the mixing ports may open radially through a hollow control member, a barrier being provided between the inlet sides of the hot and cold mixing ports and the valve member being slidable between positions partially closing the outlet sides of the mixing ports for varying the proportions of hot and cold fluid admitted therethrough. In one exemplary embodiment later to be described in detail the hollow control member has a portion extending axially of the responsive element and is itself axially displaceable between a valve opening and a valve closing position in respect of one of the inlet ports. As later described in detail the valve member may be secured to one end of the temperature responsive element and the other end of the temperature responsive element may be secured to a temperature control member whereby the temperature of the fluid mixture at the outlet can be controlled by changing the position of the temperature control member. In one exemplary embodiment a manually rotatable member is provided in the housing and is independently controllable both for axial and rotational movement. The rotational movement is utilised to control the position of the temperature control member while the axial movement is utilised to control opening and closing of the main inlet ports.

In alternative forms of the invention the control of the temperature setting is provided at the opposite end of the housing to the control for the volume of throughput. This provides simplification of the mixing valve both from the point of view of construction and from the point of view of maintenance during service.

In one embodiment, as later described in detail, the hollow control member is non-axially, but rotatably, movable within the housing, control of the setting of the temperature responsive element being controlled by rotation of the hollow control member. This provides a particularly easily fabricated and maintained structure with the throughput control valve means being cooperable with interior surfaces of the hollow control member.

A preferred form of the invention provides a thermostatic mixing valve comprising a housing; two fluid inlet ports for admitting fluid to be mixed; an outlet port for discharging fluid from the housing, a hollow support member fixedly located within said housing, an annular chamber being provided within the housing about the hollow support member; hot and cold mixing ports opening radially outwardly from the interior of the hollow support member; a barrier within the hollow member separating the hot and cold mixing ports, the inlet ports being connected respectively to the interior of the hollow member on opposite sides of the barrier, a valve member movable for controlling the proportional flow of fluid from the mixing ports; and a "coiled coil" temperature responsive element mounted within the chamber and connected to the valve member for adjusting the position of the valve member responsive to changes in temperature fluid within the chamber. With the hollow support member being fixedly located within said housing it is possible to have valve seals cooperating with the hollow support member which are axially but non-rotatably movable relative to the support member with a consequent reduction in wear and increased life for the seals as compared with an arrangement in which there is rotational movement of the seals relative to the hollow support member.

The invention will be described, by way of example, with reference to FIGS. 1 to 4 of the accompanying drawings which illustrate in diagrammatic sectional view four embodiments of mixing valve embodying the invention:

Figure 1:
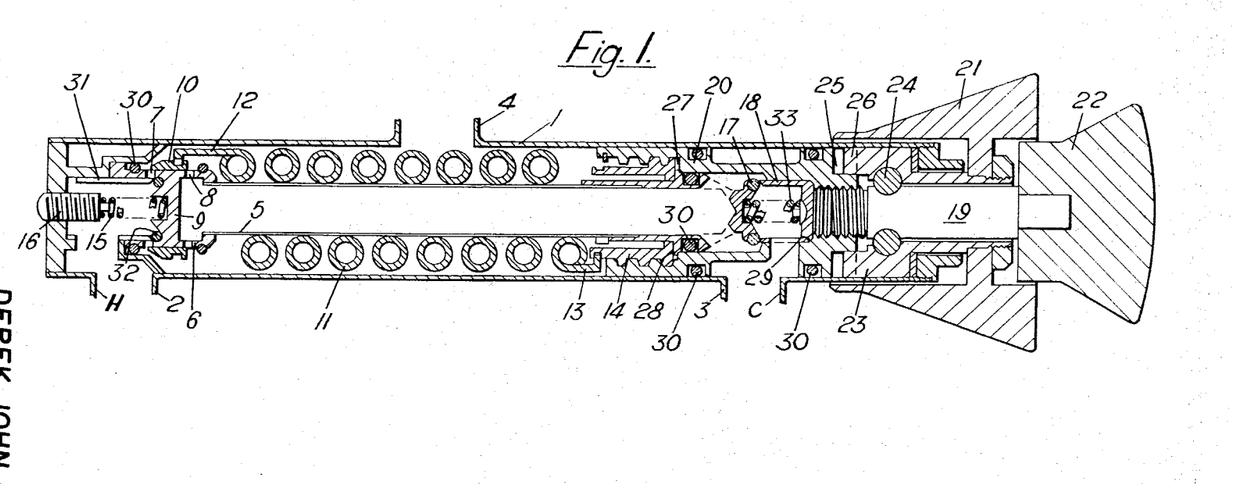

In FIG. 1 of the drawing there is shown a mixing valve comprising a housing 1 provided with a hot inlet 2, a cold inlet 3 and an outlet port 4. Extending axially within the housing 1 is a hollow control member 5 having a larger diameter portion 6 at one end thereof. Extending radially through the larger diameter cylindrical portion 6 of the hollow control member are hot mixing ports 7 and cold mixing ports 8. A barrier 9 extends across the hollow control member to separate the hot and cold mixing ports 7 and 8. An annular valve member 10 is slidably mounted on the exterior of the larger diameter portion 6 so that upon axial movement relative to the hollow member the hot and cold mixing ports are closed to a greater or lesser extent so as to control the proportion of fluid allowed to pass through the mixing ports in dependence upon the axial position of the valve member 10. In order to allow for smooth operation of the valve member 10 the contacting surfaces of the valve member 10 and the larger diameter portions 6 may be provided with surface coatings of polytetrafluoroethylene or similar low friction material. A coiled coil bimetallic laminated strip 11 is mounted within the annular space between the housing and the hollow member 5. One end 12 of the bimetallic element is connected to the valve member 10 while the other end 13 of the bimetallic element is secured to a temperature control member 14.

The hollow member 5 is supported for sliding movement axially of the housing and is urged to the right, referring to the drawing, by a compression spring 15, the tension of which is controllable by a spring adjustor 16. In the position shown the hot inlet port 2 is closed for the flow of liquid by a valve member 31 engaging an O-ring valve seat 32.

At the right hand end of the hollow member 5 there is provided a control valve for the cold inlet port 3 which comprises a valve member 18 axially movable into engagement with a valve seat 17 which also is in the form of an O-ring seal. O-ring seals can be used for the valve seats 17 and 32 as suitable stops are provided for preventing over-compression of the O-rings. Suitable keying is provided for holding the hollow member 5 against rotation with the temperature control member 14 being keyed for sliding movement axially of the hollow member 5 so as to be non-rotatable relative to the hollow member 5. A manually rotatable member 20 is provided about the right hand end of the hollow member 5 and comprises a multi-start quick action thread engageable with a corresponding thread on the temperature control member 14 whereby rotation of the manually rotatable member 20 will cause axial displacement of the temperature control member 14. A temperature setting control knob 21 is provided for rotation at the right hand end of the housing and is drivingly connected to a rotational drive member 23 which, at its left hand end, comprisee a plurality of teeth 26 which co-operate with teeth 25 on the manually rotatable member 20 for ensuring that the member 20 is rotationally positioned in accordance with the position of the temperature setting control knob 21. The teeth 25 and 26 have axially extending co-operating surfaces so that the rotational connection between members 20 and 23 is maintained despite relative axial movement therebetween. Retained by a ball race 24 within the rotational drive member 23 is a main valve closing control member 19 having mounted on its right hand end a volume on/off control knob 22.

The left hand end of the main valve closing control member 19 is threadedly connected to an internal screw thread on the manually rotatable member 20 whereby rotational movement of the knob 22 will cause rotation of the member 19 with consequent axial movement of the manually rotatable member 20. The valve member 18 is urged into engagement with a tapered shoulder 29 internally of the member 20 by means of a compression spring 33. Various O-ring seals 30 are shown in the Figure at appropriate places for preventing leakage of fluid.

The operation of this thermostatic control valve will now be described.

In FIG. 1 the control valve is shown in its off position with both the main inlet ports being closed by their respective main control valves comprising valve members 31 and 18 and valve seats 32 and 17. In order to start the operation of the valve the knob 22 is rotated so as to cause movement of the manually rotatable member 20 towards the right. Initially the valve 15 causes the hollow member 5 to move to the right so as to provide for hot fluid to be able to flow through the inlet port 2 and the mixing port 7 to the annular mixing chamber containing the coiled coil bimetal 11. As the spring 33 almost balances spring 15 any substantial flow through the inlet port 2 will cause a decrease in the pressure acting on the left hand end of the hollow member 5 in comparison with the static pressure acting on the right hand end of the hollow member 5 so that the hollow member 5 can establish a balance position with both of the inlet ports open and with the shoulders 27 and 28 spaced apart. Further opening movement of the valve by rotation of the knob 22 to retract manually rotatable member 20 will cause both inlet ports to be open to a greater extent in a balanced manner.

The ratio of hot and cold fluids fed from the outlet port 4 depends upon the position of the annular valve member 10 and the extent to which it obstructs the hot and cold mixing ports 7 and 8. The position of the annular member 10 is controlled by the bimetallic element 11 which is positioned generally in accordance with the rotational position of the manually rotatable member 20 acting through the quick action multistart thread on the temperature control member 14. For any particular setting of the temperature control member 14 the right hand end of the bimetallic element 11 will be located in a position such that fluctuations in temperatures of the mixed liquid will cause expansion or contraction of the axial length of the bimetallic element. Thus upon the temperature of the mixture increasing the bimetallic element expands with consequent leftward movement of the annular valve member 10 partially to close the hot inlet mixing port 7 and to open the cold mixing port 8. The elongated nature of the bimetallic element with progressive contact of mixed fluid with the element provides a velocity feed back function whereby particularly quick and accurate response of the bimetallic element is obtained with a control function which has little tendency to hunt or fluctuate widely. By having the outlet ports 4 spaced from the right hand end of the bimetallic element 11 a relatively dead space is provided at the right hand end of the bimetallic element 11 which results in a certain amount of stabilisation of the temperature response signal which again helps to provide a reliable temperature output of mixed fluid.

It will be appreciated that this described thermostatic valve has a number of advantages. In particular the coiled coil bimetallic element provides a fast response due to the large surface area of the bimetal and this compares favourable with prior art thermostatic mixing valves which have relied upon vapour pressure bellows type thermal response elements. Thus vapour pressure bellows type elements have a long response time due to the need for evaporation or condensation to take place. Because of the quick response accurate setting of output temperature can be obtained while the velocity feed back function arising from the graduated sensing of temperature mixed fluid along the length of the element helps to give a quick response with little hunting or fluctuation. Additionally the temperature of the mixed fluid is sensed immediately after mixing in a small cavity which again helps to give the desirable quick response. Because of the quick response with little hunting the control valve can be arranged to have a large control movement for a given temperature change with consequent increased accuracy. A particularly illustrative embodiment can readily be manufactured out of stainless steel with the provision of cheap and efficient O-ring seals for preventing leakage of fluid. The simple arrangement is such that volume of fluid throughput is controlled by one member, the knob 22, while the output temperature is controlled by another member, knob 21. This leads for particularly simple use of the device due to the balanced floating action of the hollow member 5 which can be properly adjusted when setting up the thermostatic valve in a particular environment simply by adjusting the spring adjustor 16.

A further improvement which can be included in the described embodiment of FIG. 1, is the inclusion of means to prevent further rotation of the knob 22 once it has reached a fully open position. Such means may comprise an expansible grip ring provided in a V-section annular groove at the juncture of the members 20 and 23, this ring being expanded into gripping engagement with the inside of the tubular housing 1 as the members 20 and 23 are brought together in an axial direction.

Figure 2:
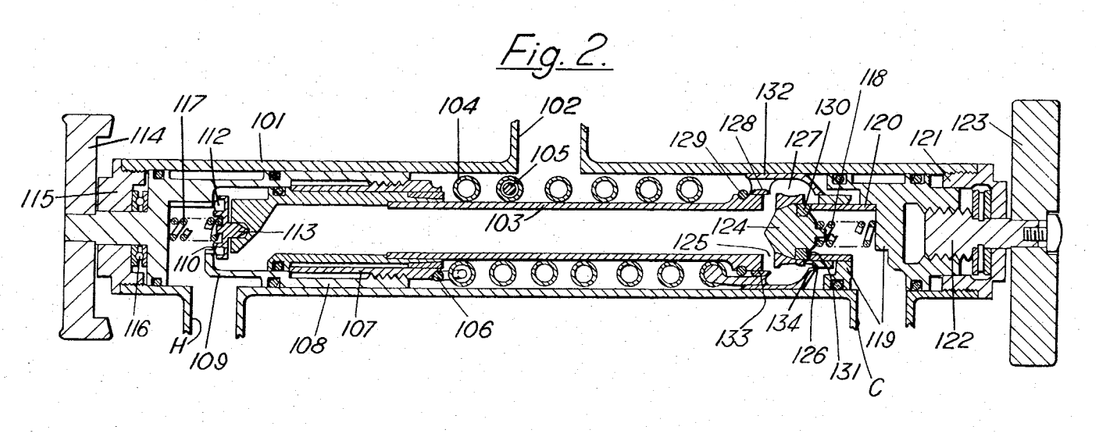

In FIG. 2 there is shown a thermostatic mixing valve comprising a housing 101 provided with a hot inlet H, a cold inlet C and an outlet port 102. Extending axially within the housing 101 is a hollow control member 103 having hot mixing ports 125 and cold mixing ports 126 extending radially through the hollow control member 103 near the right hand end thereof. A barrier member 124 extends across the interior of the hollow control member to separate the hot and cold mixing ports 125 and 126. An annular valve member 132 is slidably mounted on the exterior of the portion of the hollow control member provided with the mixing ports and has portions 133 and 134, co-operating with the hot and cold mixing ports 125 and 131 respectively, so that upon axial movement of the valve member 132 relative to the hollow member 103 the hot and cold mixing ports are closed to a greater or lesser extent so as to control the proportion of fluid allowed to pass through the mixing ports in dependence upon the axial position of the valve member 132. In order to allow for smooth operation of the valve member 132 one of the contacting surfaces of the valve member and the hollow member may be provided with a surface coating of polytetrafluoroethylene or other low friction material. A coiled coil bimetallic laminated strip 104 is mounted within the annular space between the housing 101 and the hollow member 103. One end of the bimetallic element is connected to the valve member 132 while the other end of the bimetallic element is secured at 106 to a temperature control member 107.

The temperature control member 107 is keyed for axial sliding movement relative to the hollow member 103 and threadedly engages a sleeve portion of a manually rotatable member 109. As shown the manually rotatable member is rotatable by means of a knob 114 so that rotation of knob 114 will cause axial movement of the temperature control 107 with consequential control of the position of the left hand end of the thermally responsive element 104.

The hollow member 103 is supported for sliding movement axially of the housing and is urged to the right, referring to the drawing, by a compression spring 117, the tension of which is controllable by a spring adjuster plug 115 which is threaded into the left hand end of the housing 101 whereby screwing the adjuster 115 into, or out of the housing adjusts the position of the manually rotatable member 109 and thus, also, the position of the left hand end of the spring 117. It will be appreciated that alternative means can be used for mounting the spring 117 for adjustability. In the position shown the inlet of hot fluid is closed by a seal 112 of a valve member 113 engaging a valve seat 110 of an inlet port opening axially towards the left hand end of the hollow member 103. The valve member 113 is mounted for rotational movement at the left hand end of the hollow member 103 whereby the seal 112 can rotate in conjunction with the valve seat 110 should the knob 114 be rotated when the inlet port within the valve seat 110 is closed. A ball thrust race 116 is shown provided between the adjuster 115 and the manually rotatable member 109 for absorbing the thrust of the spring 117.

At the right hand end of the hollow member 103 there is provided a control valve for the inlet of cold fluid which comprises an inlet port valve member having a seat 131 engageable with a seal 130 by the hollow member 103. The hollow member 103 is held against rotation by suitable keying co-operating with an axially movable member 119 carried within the housing 101 for axial movement but itself keyed against rotation by engagement with a plug member 121 screwed into the right hand end of the housing 101. Axial movement of the member 119 is controlled by coaction of a coarse pitch thread on that member with a threaded portion of a manually rotatable fluid flow control member 122 carrying a knob 123 or other form of control lever. A spring 118 is shown under compression between the member 119 and the barrier portion 124.

The member 132 is shown forming a mixing change 127 in which fluid admitted through the hot and cold mixing ports 125 and 126 is mixed before being allowed to leave through a plurality of outlet passages, only one of which is shown at 128. Various O-ring seals are shown in the Figure at appropriate places for preventing leakage of fluid.

The operation of the thermostatic control valve will now be described.

In FIG. 2 the control valve is shown in its off-position with both the main inlet ports being closed by their respective main control valves comprising valve members 120 and 110 and valve seats 130 and 112. In order to start the operation of the valve the knob 123 is rotated so as to cause movement of the member 119 to the right by the action of the coarse pitch thread between members 122 and 119. Initially the spring 117 causes the hollow member 103 to move to the right to allow the admission of the hot fluid to the interior of the hollow member 103 from which it can pass through hot mixing port 125 to the mixing chamber 127, and from thence through the ports 128 to the chamber containing the thermally responsive element 104 and having the outlet port 102. As the spring 118 almost balances the spring 117 any substantial flow through the hot inlet port will cause a decrease in the pressure at the left hand end of the hollow member 103 in comparison with the static pressure acting on the right hand end of the hollow member 103 so that the hollow member 103 can establish a balanced position with both the inlet ports open. Further opening movement of the valve by rotation of the knob 123 to retract the member 119 will cause both inlet ports to be opened to a greater extent in a balanced manner.

The ratio of hot and cold fluid in the mixture fed from the outlet port 102 depends upon the position of the annular valve member 132 and the extent to which its portions 133 and 134 obstruct the hot and cold mixing ports 125 and 126. The position of the annular member 132 is controlled by the bimetallic element 104 which is positioned generally in accordance with the rotational position of the manually rotatable member 109 acting through a thread, which is preferably of a quick action multi-start type, on the temperature control member 107. For any particular setting of the temperature control member 107 the left hand end of the bimetallic element will be located in position such that fluctuations in temperature of the mixed liquid will cause expansion or contraction of the axial length of the bimetallic element. Thus upon the temperature of the mixture increasing the bimetallic element will expand with consequent leftward movement of the annular valve member 132 partially to close the hot inlet mixing port 125 and to open the cold mixing port 126.

The simple arrangement is such that volume of fluid throughput is controlled by one member, the knob 123, while the output temperature is controlled by another member, knob 114. With a coarse pitch thread connection between members 119 and 122 a simple lever can be used to replace the knob 123 so that a very quick and ready control of fluid throughput can be given to anyone utilising the valve. This leads to particularly simple use of the device due to the balanced floating action of the hollow member 103 which can be properly adjusted when setting up the thermostatic valve in a particular environment simply by adjusting the spring adjuster 115.

Use of a preliminary mixing chamber 127 allows a pressure drop to be provided between the mixing chamber and the chamber containing the thermally responsive element. As well as providing better mixing this pressure drop allows the use of an open discharge from the outlet port 102 even when high pressure liquid is supplied to both the inlet ports, as should the mixing valve be used at the bottom of a high tower block of flats. If there was no such provision for a pressure drop there would be a tendency under such conditions for turbulence to cause severe vibration of the sleeve 132 with consequent damage and wear to the mixing valve quite apart from the unpleasant noise which might be caused.

While it is especially desirable for the portion of the hollow member 103 contacted by the sleeve valve member 132 to be coated with a low friction material it is also advantageous for the entire exterior surface of the hollow member 103 to be coated with a low friction material as this helps to prevent the build up of lime during extended use of the thermostatic mixing valve in hard water districts. Additionally this eases sliding movement of the thermo-responsive element which can then be allowed readily to contact the exterior of the hollow member 103.

The fact that the valve member 113 is carried for rotational movement by the end of the hollow member 103 ensures that when the mixing valve is in its off-position it is still possible to adjust the knob 114 to change temperature setting without damage to the sealing ring 112. Thus the sealing ring 112 can simply rotate with the manually rotatable member 109 and seat 110 against which it contacts. The threads between sleeve 108 and member 107 and between members 119 and 122 may suitably be coated with polytetrafluoroethylene or other low friction material in order to facilitate ready and easy movement of the control valves 114 and 123.

A further improvement which may be used with the coiled coil thermal-responsive element is the threading of a strand or cord 105 of plastics, silicone rubber or other suitable flexible material through the interior of the coiled coil thermo-responsive element 104 to reduce dead space within the coil and allow an effective increase in the gain by permitting addition of more bimetal to give increased accuracy and sensitivity without excessive vibration or oscillations being set up during use.

Figure 3:
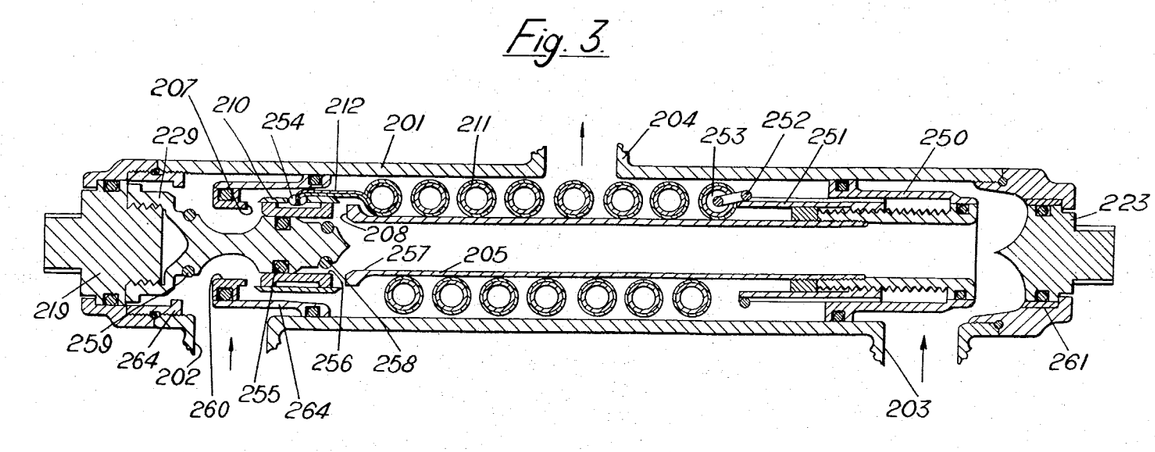

FIG. 3 discloses an embodiment in which the principle difference from those of the earlier Figures is that the hollow control member is not axially movable within the housing. Generally the various parts of this embodiment are given the same reference numerals, where applicable, as the embodiment of FIG. 1 with the exception that they are preceded by the number two hundred.

Referring to FIG. 3, a hollow control member 205 is screw threadably secured to a rotational drive member 223 so as to be rotatable, but non-axially slidable, with the member 223 within the housing 201. A sleeve 250 is secured by cement 261 to the housing 201 and is keyed to a temperature control member 251 screw threaded, by a quick action thread, to the member 223. With this arrangement rotation of the member 223 will cause the member 251 to move axially within the housing 201. A connector 252 is secured to the member 251 and has a portion pivotally received within a plastics sleeve 253 held within the endmost convolution of the smaller helix of the coiled-coil temperature responsive element 211. At the other end 212 of the temperature responsive element a ball 254 and socket connection is provided with the sleeve valve member 210. The ball 254 and sleeve 253 may be made of a plastics material, for examply polytetrafluoroethylene and are provided to permit proper accommodation of twisting of the temperature responsive element during temperature changes.

A main valve closing control member 219 is rotatably mounted within the housing 1 and is threaded, by means of a quick-action thread, to a main valve member 229. The member 229 is keyed to a sleeve 264 secured inside the housing 2 so as to be axially movable upon rotation of the main valve member 219. The main valve member 229 carries an O-ring seal 255 engageable with an interior wall 256 of the hollow control member 205 to provide a barrier between the hot and cold mixing ports 207 and 208. The member 229 also carries main shut-off seals 259 and 258 respectively engageable with cylindrical surfaces 260 and 257 of the hollow control member to shut-off the flow of fluid to the mixing ports 207 and 208.

During use of this embodiment cold water flows in through inlet 203, through radially extending ports in sleeve 250 and member 223 to the interior of the hollow control member 205 and thence to the cold mixing port 208. Hot water from hot inlet 202 passes through radially extending ports in the sleeve 264 to the hot mixing port 207. The ratio of hot and cold water is controlled by the sleeve valve 210 as described with reference to the other embodiments.

With this arrangement rotation of the member 223 simply controls the setting of the temperature responsive element 211 while rotation of the member 219 controls the volume throughput by means of the valve seals on valve member 229 cooperating with surfaces of the hollow contrl member 205. Rotation of the hollow control sleeve 205 provides a further advantage that a self cleaning action is provided between the surfaces of the hollow member 205 and the valve sleeve 210.

Figure 4:
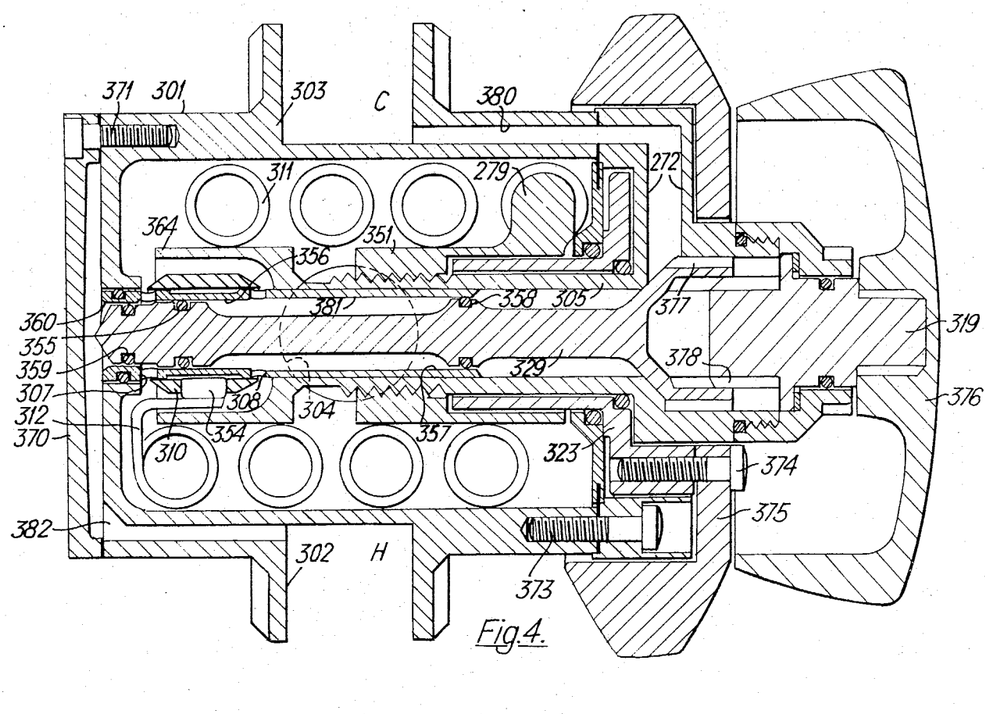

Referring to FIG. 4, there is shown a thermostatic mixing valve comprising a housing 301, provided with hot and cold inlet ports 302 and 303. Two outlet ports are provided from diametrically opposite sides of the housing, one of these being indicated at 304. A hollow support member 305 extends axially within the housing 301 so as to define an annular chamber within the housing. The hollow member 305 is formed integrally with a housing enclosure member 272 which is secured in close relationship to one end of the housing by a plurality of cap screws one of which is shown at 373. Supported within the annular chamber about the hollow member 305 is a coiled coil bimetallic laminated temperature responsive element 311. Extending axially of the hollow member is a volume control member 329 carrying three seals, 359, 355 and 358 cooperable with the interior of a sleeve portion 381 of the hollow member 305. Hot and cold mixing ports 307 and 308 open radially outwardly through the sleeve 381 from the interior of the hollow member. The seal 355 is engageable with an interior surface 356 of the sleeve 381 between the hot and cold mixing ports so as to provide a barrier separating the hot and cold mixing ports. The seals 359 and 358 are engaged with interior surfaces 360 and 357 respectively of the sleeve 381 in the illustrated closed position of the thermostatic valve. With this arrangement upon axial movement of the volume control member 329 the seals 359 and 358 are moved out of engagement with the surfaces 360 and 357 so as to admit flow from the hot and cold inlet ports 302 and 303 to the mixing ports 307 and 308. Such axial movement of the volume control member 329 is controlled by a manually rotatable knob 376 mounted on a rotatable member 319 which is threadably engaged at 378 with the member 329. The member 329 itself is supported against rotation by key means 377 engaging in keyways in the housing end closure 272. A valve member in the form of a sleeve 310 is mounted about the sleeve portion 381 of the hollow member so that upon movement axially of the hollow member it varies the proportions of fluid which may be admitted from the hot and cold mixing ports. A ball joint connection 354 is provided between the sleeve 310 and an extension 312 of the temperature responsive element 311. The axial position of the end of the temperature responsive element 311 remote from the portion 312 is flexibly connected to a projection 279 from a temperature control member 351. The flexible connection is provided in order to accommodate distortion of the temperature responsive element which would tend to take place upon changes in temperature of mixed fluid within the annular chamber. The temperature control member 351 is threaded by means of a quick-action thread to the exterior of the hollow member 305 and is keyed to a rotatable member 323 so as to be rotatable responsive to rotation of the member 323 with consequent axial movement being caused by the action of the thread. With this arrangement a change in the rotational position of the member 323 causes both axial and rotational movement of the sleeve 310 so as to provide a self-cleaning action between the mixing ports and the valve sleeve. An annular manual control ring 375 is rotatably supported by the housing portion 272 and is connected by means of a cap screws 374 extending through an arcuate slot in the housing portion 272 with the rotatable member 323.

As will be apparent, with the volume control member 329 retracted from the position shown in the Figure, communication is provided from the cold mixing port 303 via a passage 380 in the housing 301 and housing portion 272 to the interior of the hollow member 305 and thence to the cold mixing port 308. The hot inlet 302 communicates via passage 382 with the other end of the hollow member, the passage 382 being provided by a closure 370 secured by cap screws 371 to the end of the housing 301. An annular baffle 364 is provided as an extension of the hollow member surrounding the mixing ports and valve sleeve 310 whereby fluid flowing from the mixing ports is first directed axially in a direction away from the temperature responsive element before direction of flow is reversed into the end of the annular chamber containing the temperature responsive element. This directional reversal of the flow of fluid leaving the mixing ports assists in ensuring proper mixing of the fluids before they reach the temperature responsive element, further assistance in this respect being achieved by the turbulence and non-laminar flow to be expected due to the greatly increased area for flow as the liquid passes radially outwardly from the mixing ports.

Generally the structure of the mixing valve can be fabricated from plastics mouldings with stainless steel being used for the sleeves 310 and 381 which cooperate to provide the valve member and mixing ports. With the construction illustrated there is the further advantage that simply by removing first the knob 376, to give access to the cap screws 374, then the ring 375 to give access to the cap screws 373, the cap screws 373 can be removed to release the end portion 272 of the housing permitting removal of the hollow member 305 and all working parts of the valve as a unit for repair, replacement or cleaning should this become necessary.

With the described structure the simple axially reciprocating motion of the volume control member 329 enables O-ring type sealing valves to be used for controlling on/off action and the volume throughout under such conditions that a long seal life can be expected, while an additional rotational movement is provided between the valve sleeve 310 and the mixing ports to provide a good self-cleaning action. Furthermore, due to the small extent of the temperature responsive element which is in the direct flow of mixed fluid the temperature responsive element has a minimal effect in retarding flow of fluid through the valve and also is less likely to be so effected by changes in volume throughput as to change the temperature setting. Thus the resistance to flow given by the temperature responsive element will, upon an increase of rate of flow of fluid through the valve, tend to cause contraction of the length of the temperature responsive element. This is kept to a minimum with the described construction in addition to the more important attribute of getting a good response with hunting or fluctuations being damped out by the provision of a large portion of the temperature responsive element in a relatively stagnant pocket out of the direct flow of fluid from the mixing ports to the outlet port.

It will be appreciated that by reversing the twist of the temperature responsive element 211 it can be made to contract upon heating. Substitution of such a reverse twist element would enable the thermostatic valves to function with the hot and cold inlet connections reversed. With the embodiment of FIG. 4 in order to accommodate reversed hot and cold inlets, the housing can simply be rotated through 180°, one outlet being used for the mixed liquid and the other being closed by a plug.

We claim:

1. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between the hot and cold fluid inlet ports; hot and cold mixing ports opening radially outwardly through the hollow control member; and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, the means connecting the valve member with the temperature responsive element wehreby the valve member is movable in response to changes in axial length of the temperature responsive element.

2. A mixing valve according to claim 1, wherein the hollow control member extends axially of the temperature responsive element, said temperature responsive element receiving space being an annular space within the housing about the hollow member.

3. A mixing valve according to claim 1, wherein the valve member is in the form of a sleeve about the hollow control member and includes a mixing chamber provided therein for mixing fluid from the mixing ports before discharge into the chamber containing the temperature responsive element, said mixing chamber being provided with a reduced section outlet.

4. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between the hot and cold fluid inlet ports; hot and cold mixing ports opening radially outwardly through the hollow control member, and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, means connecting the valve member with the temperature responsive member whereby the vale member is movable in response to changes in axial length of the temperature responsive member, a valve inlet closing member, and a main valve closing control member mounted for movement between valve open and valve closed positions, said main valve closing control member in its closed position holding said valve inlet closing member in position closing the inlet to one end of said hollow control member, the hollow control member itself being axially displaceable between a valve opening and a valve closing position in respect of one of the inlet ports, said valve closing member during movement from its valve open to its valve closed position being operative both to move the hollow member axially to close the one inlet port and to move the valve member into position closing said other inlet port.

5. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between the hot and cold fluid inlet ports; hot and cold mixing ports opening radially outwardly through the hollow control member, and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, a temperature control member movable axially relative to the housing, the valve member being secured to one end of the temperature responsive element and the other end of the temperature responsive element being secured to the temperature control member whereby the temperature of the fluid mixture at the outlet can be controlled by changing the position of the temperature control member axially relative to the housing, a manually rotatable member supported in the housing and a multistart quick-action thread provided between said manually rotatable member and said temperature control member, the temperature control member being keyed for axial sliding movement relative to the hollow control member and being axially displaceable by said manually rotatable member.

6. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between hot and cold fluid inlet ports; hot and cold mixing ports opening radially outwardly through the hollow control member, and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, means connecting the valve member with the temperature responsive element whereby the valve member is movable in response to changes in axial length of the temperature responsive element, a valve inlet closing member and a main valve closing control member mounted for movement between valve open and valve closed positions, said valve closing control member in its closed position holding said valve inlet closing member in position closing the inlet to one end of said hollow control member, and means holding the hollow control member against axial movement in the housing, the valve inlet closing member comprising a seal slidably engaged within the hollow control member to provide said barrier and two valve seals engageable with the interior of the hollow control member in the valve closed position of the valve closing control member to close the inlet through the hollow control member to the hot and cold mixing ports.

7. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between hot and cold fluid inlet ports; hot and cold mixing ports opening radially outwardly through the hollow control member, and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, a temperature control member axially but non-rotatably slidable relative to the housing, the valve member being secured to one end of the temperature responsive element and the other end of the temperature responsive element being secured to the temperature control member whereby the temperature of the fluid mixture at the outlet can be controlled by changing the position of the temperature control member axially relative to the housing and the valve member is movable in response to changes in axial length of the temperature responsive element, and a quick-action screw thread connecting the hollow control member to the temperature control member whereby rotation of the hollow control member causes axial adjustment of said other end of the temperature responsive element.

8. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between hot and cold fluid inlet ports; hot and cold mixing ports opening radially outwardly through the hollow control member, and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, a control member axially movable relative to said housing, means connecting the valve member with one end of the temperature responsive element whereby the valve member is movable in response to changes in axial length of the temperature responsive element, a sleeve received within a turn of the small helix of the temperature responsive element near the other end thereof, and a pivotal connection provided between the temperature control member and said sleeve.

9. A thermostatic mixing valve comprising a housing; two fluid inlet ports for admitting to the housing fluid to be mixed; an outlet port for discharging fluid from the housing; a hollow control member mounted within the housing, the fluid inlet ports communicating with opposite ends of the hollow control member; a barrier within the hollow control member preventing communication between hot and cold fluid inlet ports; hot and cold mixing ports opening radially outwardly through the hollow control member, and thermal control means for adjusting the ratio of quantities of fluid passed from the mixing ports in response to the temperature of fluid flowing from the mixing ports to the outlet port, said thermal control means including a temperature responsive element comprising a coiled coil laminated strip received within a temperature responsive element receiving space in the housing communicating the mixing ports with the outlet port, a valve member mounted externally of the hollow control member for controlling the proportion of hot and cold fluid flow from the mixing ports, the said valve member being slidable between positions partially closing the outlet sides of the mixing ports for varying the proportions of the hot and cold fluids passed therethrough, and a ball and socket connection between one of the temperature respnsive element and the valve member whereby the valve member is movable in response to changes in axial length of the temperature responsive element.

10. A thermostatic mixing valve comprising a housing; two fluid inlet ports for admitting fluid to be mixed; an outlet port for discharging fluid from the housing; a hollow support member fixedly located within said housing, an annular chamber being provided within the housing about the hollow support member; hot and cold mixing ports opening radially outwardly from the interior hollow support member; a barrier within the hollow member separating the hot and cold mixing ports, the inlet ports being connected respectively to the interior of the hollow member on opposite sides of the barrier; a valve member movable for controlling the proportional flow of fluid from the mixing ports; and a coiled coil temperature responsive element mounted within the chamber and connected to the valve member for adjusting the position of the valve member responsive to changes in temperature of fluid within said chamber.

11. A mixing valve as claimed in claim 10, wherein the mixing ports communicate with the chamber at one end thereof and the outlet port is provided from the chamber at a position intermediate the ends of the temperature responsive element.

12. A mixing valve as claimed in claim 10, wherein means are provided for causing a reversal of flow direction axially of the hollow member of fluid as it passes from the mixing ports to the annular chamber.

13. A mixing valve according to claim 12, wherein said means for causing a reversal of flow direction comprises an annular flow deflecting baffle portion of the hollow member surrounding the mixing ports and valve member.

14. A mixing valve according to claim 10, comprising a volume control member which extends axially of the hollow member and separate flow control valves carried by the volume control member for the hot and cold fluids, said volume control member being axially movable to control the volume of fluid flow to the mixing ports.

15. A mixing valve according to claim 14, comprising a seal carried by the volume control member and engaging the interior of the hollow member to provide the barrier, the separate flow control valves comprising two further seals engageable with the interior of the hollow member to prevent flow of fluid from the inlet ports to the mixing ports, said further seals being disengageable from the hollow member responsive to axial movement of the volume control member.

16. A mixing valve according to claim 10, which comprises a manually operable temperature control member, the temperature responsive member being connected at one end to said valve member and at the other end to said temperature control member whereby movement of the temperature control member causes movement of said other end of the temperature responsive element axially of the support member, wherein the valve member comprises a sleeve surrounding the hollow member, there being provided a ball joint connection between the one end of the temperature responsive element and the sleeve.

17. A mixing valve according to claim 10, wherein the hollow member, and all working parts of the valve are removable as a unit from one end of the housing.

* * * * *